United States Patent [19]

Taylor

[11] Patent Number: 5,007,590
[45] Date of Patent: Apr. 16, 1991

[54] APPARATUS AND METHOD FOR MIXING SOLID OR SEMI-SOLID WASTES WITH ADDITIVES

[75] Inventor: Patrick D. Taylor, Rockwall, Tex.

[73] Assignee: Itex Enterprises, Inc., Dallas, Tex.

[21] Appl. No.: 469,092

[22] Filed: Jan. 23, 1990

[51] Int. Cl.$^5$ .............................................. B02C 23/20
[52] U.S. Cl. ........................................ 241/25; 241/24; 241/38; 241/81; 241/101 B; 241/DIG. 38
[58] Field of Search ....................... 241/24, 25, 38, 81, 241/101 B, 260.1, DIG. 38, 15, 20, 21

[56] References Cited

U.S. PATENT DOCUMENTS

| | | |
|---|---|---|
| 1,036,327 | 8/1912 | Pickett . |
| 2,492,421 | 12/1949 | Golben ............................ 241/101 B |
| 2,874,907 | 2/1959 | Renaud et al. . |
| 2,886,287 | 5/1959 | Croley . |
| 3,925,150 | 12/1975 | Marsh ............................... 241/25 X |
| 4,105,553 | 8/1978 | Oldham . |
| 4,175,039 | 11/1979 | Fisher . |
| 4,353,803 | 10/1982 | Dover . |
| 4,362,628 | 12/1982 | Kennedy . |
| 4,366,063 | 12/1982 | O'Connor . |
| 4,395,338 | 7/1983 | Rowton . |
| 4,509,696 | 4/1985 | Donaldson . |
| 4,536,286 | 8/1985 | Nugent . |
| 4,547,290 | 10/1985 | Pichat . |
| 4,770,708 | 9/1988 | Atkins et al. . |
| 4,815,668 | 3/1989 | Frei . |
| 4,881,690 | 11/1989 | Maier . |
| 4,884,756 | 12/1989 | Pearson ....................... 241/101 B X |

FOREIGN PATENT DOCUMENTS 1084970 2/1960 Fed. Rep. of Germany .

Primary Examiner—Timothy V. Eley
Attorney, Agent, or Firm—Arnold, White & Durkee

[57] ABSTRACT

An apparatus and method for mixing solid or semi-solid waste materials with one or more additives to produce a solid or semi-solid end product includes a separator with paddle-type chopper augers for receiving the solid or semi-solid waste material. The chopper augers reduce the size of lumps contained in the waste material and discharges the material into an homogenizer. The homogenizer is equipped with pin mixers to form a substantially homogeneous mass of waste material for loading into a blender unit where the mass is blended with selective additive(s).

16 Claims, 2 Drawing Sheets

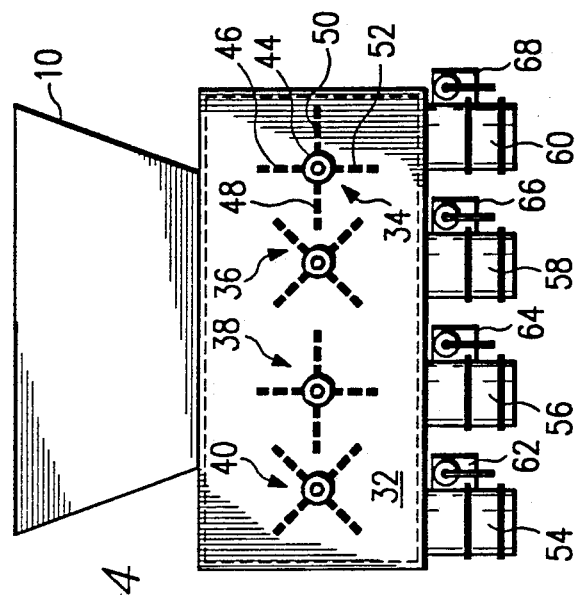
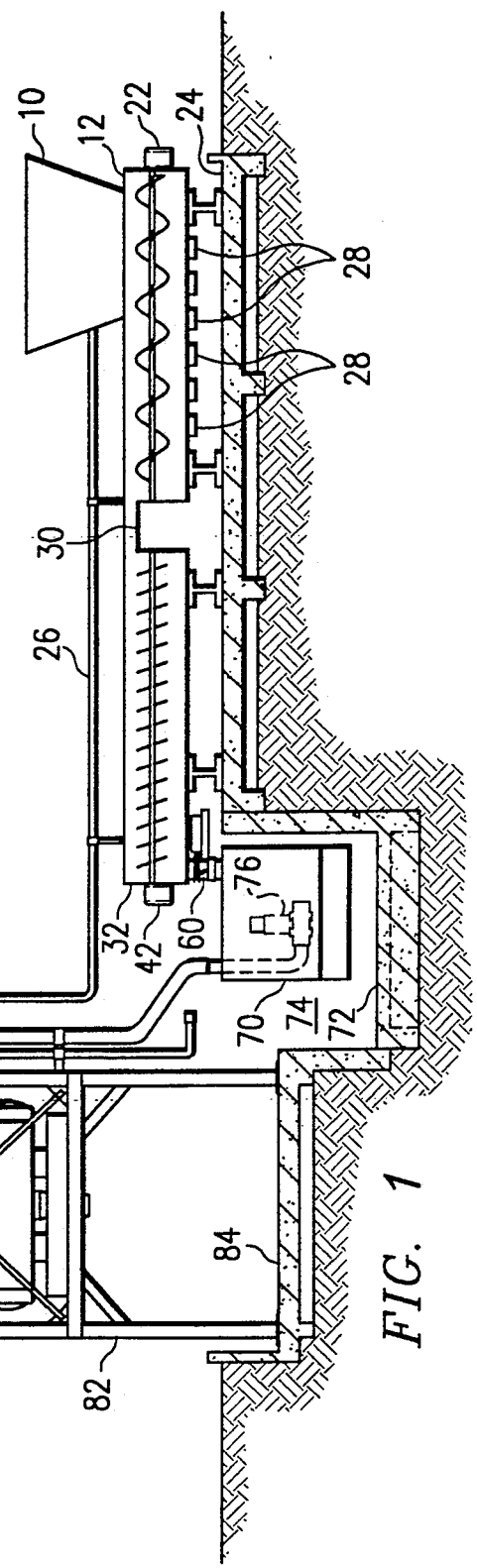
FIG. 4
FIG. 1

APPARATUS AND METHOD FOR MIXING SOLID OR SEMI-SOLID WASTES WITH ADDITIVES

TECHNICAL FIELD

This invention relates to the blending of additives with solid or semi-solid waste materials in order to produce a chemically and physically stable end products.

BACKGROUND OF THE INVENTION

Industries generate large quantities of liquid, semi-solid and solid waste materials on a daily basis. As a result of this industrial activity, large masses of such materials exist which present a considerable hazard to the environment. These waste materials are often in the form of solids or highly viscous semi-solids containing hard lumps of solid material. Of particular concern are waste materials containing heavy metals which may be leached into surface water and ground water.

A number of methods for treating waste material with additives to form a physically and chemically stable end product have been proposed. Examples of such processes are disclosed in the following U.S. Pat. Nos.: 4,741,776 issued May 3, 1988 to Bye, et al.; 4,600,514 issued July 15, 1986 to Conner; 4,547,290 issued Oct. 15, 1985 to Pichat; 4,533,395 issued Aug. 6, 1985 to Vejmelka, et al.; 4,518,508 issued May 21, 1985 to Conner; 4,509,696 issued Apr. 9, 1985 to Donaldson; 4,432,666 issued Feb. 21, 1984 to Frey, et al.; 4,338,134 issued July 6, 1982 to Graf zu Munster; 4,209,335 issued June 24, 1980 to Katayama, et al.; 4,274,880 issued June 23, 1981 to Chappell; 4,149,968 issued Apr. 17, 1979 to Kupiec, et al.; 3,947,284 issued Mar. 30, 1976 to Kitsugi, et al.; 3,841,102 issued Oct. 5, 1974 to Sinner, et al.; and 3,837,872 issued Sept. 24, 1974 to Conner. For example, U.S. Pat. No. 4,509,696 to Donaldson discloses an apparatus and method for treating disposable organic waste material with an alkaline metal silicate and a setting agent. The apparatus disclosed in the U.S. Pat. No. 4,509,696 is not, however, adapted to treat solid waste or highly viscous semi-solid waste containing hard solid lumps of waste material. Consequently, there exists a need for an apparatus for mixing solid or highly viscous semi-solid waste materials with additives in order to effect the treatment of the waste materials.

SUMMARY OF TUE INVENTION

The apparatus of the present invention provides a means whereby solid or highly viscous semi-solid waste materials containing hard lumps of solid wastes are economically and effectively mixed with additives in order to produce a chemically and physically stable end product. The apparatus of the present invention is used in conjunction with appropriate additives to produce a homogeneous end product in which hazardous components of waste materials are contained. The end product is made homogeneous through a chopping and homogenizing procedure.

Solid or semi-solid waste material to be treated by the apparatus of the present invention is placed in a receiving hopper for an initial treatment step carried out in a separator that includes multiple motor driven paddle-type chopping augers. The augers reduce the size of any lumps contained in the material as the material is conveyed by the augers to the discharge end of the separator. The waste material is discharged from the separator into a homogenizer. The homogenizer is equipped with two pair of pin-type mixing augers. Each pair of pin-mixing augers is independently reversible. Thus, the pairs of mixing augers may be driven in opposite directions.

Controlled amounts of the waste material are discharged from the homogenizer following processing therein into a storage tank for temporary collection of the waste material for the final step of blending with selected additives. The blending of the waste material and the additives takes place in a blender unit that comprises a conventionally available concrete mixing apparatus. From the storage tank, the waste material is delivered to the blender unit by means of slurry pumps that further reduces the waste particle size such that the consistency of the waste may be thoroughly mixed with selected additives.

Predetermined amounts of additives are fed into the blender unit from additive hoppers located above the blender unit. The additives are thoroughly mixed with the waste material in the blender unit in accordance with conventional operation of such blenders. The waste material/additive mixture is blended within the blender unit until the desired degree of mixing is achieved. A water source is connected to the blender unit and a control valve is activated to selectively add water to the waste material/additive mix as necessary to achieve the desired consistency. Once the desired consistency and degree of mixing have been achieved, the waste material/additive mixture is discharged through slide gate valves located at the discharge of the blender unit.

The apparatus of the present invention provides a means for blending solid or highly viscous semi-solid waste material with additives to form a homogeneous slurry-like mixture that is readily disposable. Large volumes of waste materials may be converted into a disposable material economically and in a short period of time through the use of the present invention. Moreover, the present apparatus and method is readily adapted to computer control once the required mixing time and required amounts of appropriate additive(s) have been determined.

BRIEF DESCRIPTION OF THE DRAWINGS

FIG. 1 is a side view of the apparatus of the present invention;

FIG. 4 is an end view of pin mixers of the homogenizer unit of the apparatus.

DESCRIPTION OF DRAWINGS

Figure 2:
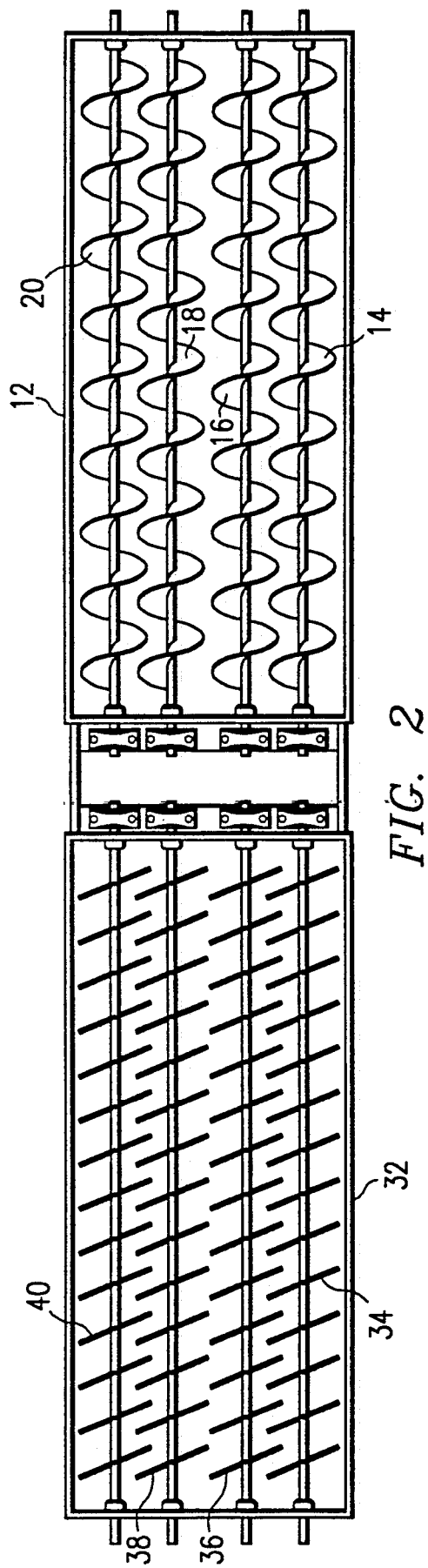
FIG. 2 is a top view of the separator and homogenizer units as components of the apparatus of the present invention.

Referring to FIG. 1, there is shown the apparatus of the present invention for processing waste material into an environmentally acceptable end product. Waste material to be treated enters the apparatus for processing by means of a sludge unloading hopper 10 positioned at one end of a separator 12 that includes rotating chopper augers 14, 16, 18 and 20, as illustrated in FIG. 2, each driven by an electrically actuated power unit 22. The separator 12 is supported on a foundation 24 by means of conventional support structure.

Depending on the consistency of the waste material to be processed, water is available at the hopper 10 by means of a feed line 26. Water, if needed, is added to the waste to control the consistency thereof for improved operation of the treatment process and to facilitate removal of foreign objects. Also provided for removal of foreign objects of magnetic material is a plurality of magnets 28 supported at the bottom of the separator 12. Such magnets are of a conventional design and are powered from an available source.

With reference to FIG. 2, each of the chopper augers 14, 16, 18 and 20, all of which are rotatively driven by individual power units 22 (as shown in FIG. 1) are controlled to circulate the waste material within the separator 12 until foreign objects are removed and large pieces of sludge are broken up as desired.

For this initial processing step of breaking up the waste material and to remove foreign objects, the augers 14, 16, 18 and 20 are driven in pairs in a clockwise or counter-clockwise direction to achieve the desired movement of waste within the separator 12. When an operator observes that the waste material within the separator 12 has been properly broken up, the direction of rotation of the augers 14, 16, 18 and 20 is set to cause a movement of the waste from right to left as illustrated in FIG. 1 and shown by the arrows 21 of FIG. 3.

The waste processed in the separator 12 passes over a dam 30 positioned between the separator 12 and the homogenizer 32. Rotatably mounted within the homogenizer 32 are pin mixers 34, 36, 38 and 40, each rotatively driven by separate electrically powered drive unit 42 (as shown in FIG. 1). The position of the pin mixers within the homogenizer 32 is best illustrated in FIG. 2. It should be noted that the power unit 42 for each of the pin mixers is not illustrated in FIG. 2.

Each of the pin mixers comprises a plurality of individual pin units where each pin unit comprises four (4) pins radially extending from a shaft as best illustrated in FIG. 4.

With reference to FIG. 4, the pin mixer 34 comprises a shaft 44 with radially extending pins including pins 46, 48, 50 and 52. The pin mixer 34 as illustrated in FIG. 2 comprises fourteen (14) pin units such as shown in FIG. 4. Note in FIG. 2 that each pin unit is mounted to the shaft 44 at an angle to promote the movement of waste in the homogenizer 32 in accordance with direction of rotation of the pin mixers. Again, the operator controls the direction or rotation of the pin mixers 34, 36, 38 and 40 to create a pattern of waste movement within the homogenizer 32 as illustrated by the arrows 33.

As the waste material passes over the dam 30 and enters the homogenizer 32, it is further treated to develop a substantially uniform mass of small particles. The waste is processed in the homogenizer 32 until the desired consistency and homogeneity of the material is achieved. At the completion of the processing step within the homogenizer 32, a plurality of gate valves 54, 56, 58 and 60 are opened and the pin mixers 34, 36, 38 and 40 are caused to rotate in a direction to deliver the waste to the now open gate valves.

Figure 3:
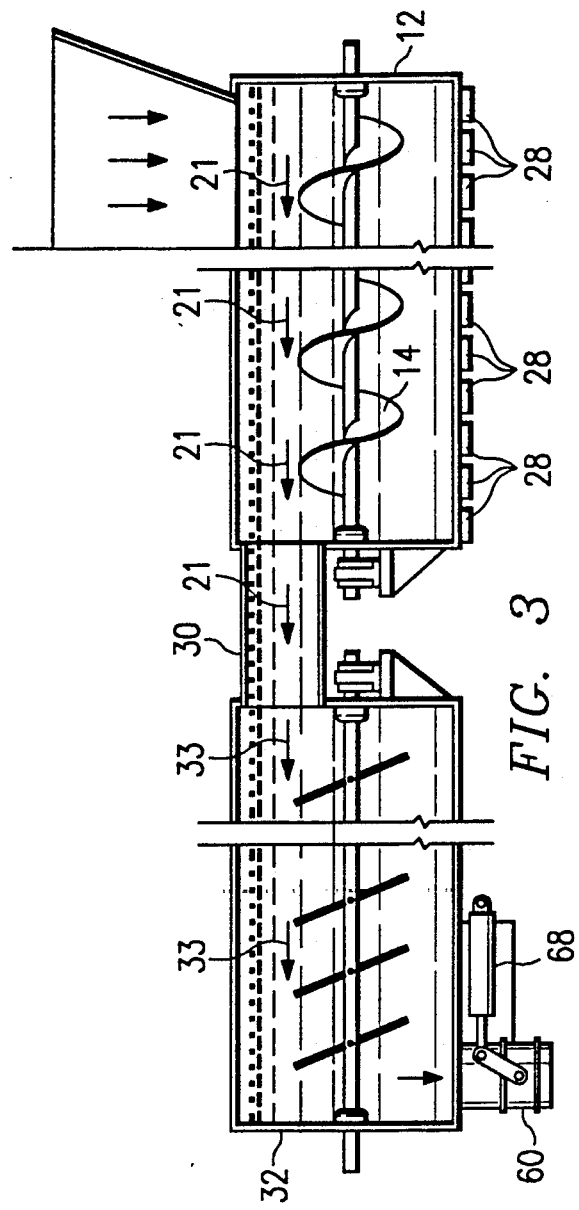
FIG. 3 is a partial cutaway side view of the separator and homogenizer units of the apparatus.

As best illustrated in FIGS. 3 and 4, the gate valves 54, 56, 58 and 60 are operated by electrically powered actuators 62, 64, 66 and 68.

Figure 5:
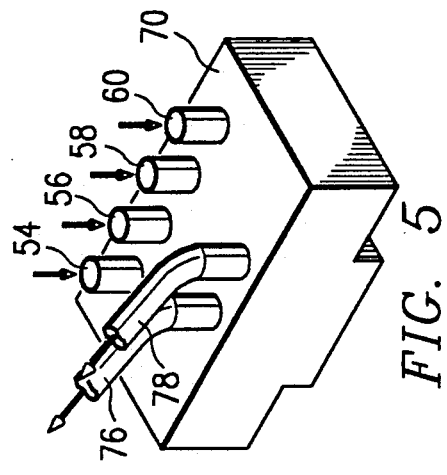
FIG. 5 is a partial perspective view of the slurry mixing tank of the apparatus.

With the gate valves of the homogenizer open, the now substantially homogenized waste is dropped into a storage tank 70 (FIG. 1) supported on a foundation 72 within a pit 74. The waste material which has now been treated in two steps has a consistency to enable pumping of the material to the next processing step. Mounted within the storage tank 70 are two slurry pumps 76, only one shown in FIG. 1, each having an outlet pipe 78 connected to a blender unit 80. The storage tank 70 and the discharge lines 78 are best illustrated in FIG. 5 along with a schematic representation of the gate valves 54, 56, 58 and 60.

With reference to the blender unit 80, it is supported within a frame 82 mounted to a foundation 84. The height of the blender unit 80 above the foundation 84 is sufficient to permit a truck to be positioned under the blender unit to accept the processed waste material for delivery to a waste storage site. Typically, the blender unit may be a conventional mixer usually employed for concrete mixing such as marketed by BHS/Ross and known as a "Compulsory Mixer".

Positioned above the blender unit 80 are one or more additive hoppers 86 (only one shown in FIG. 1) for storing additive materials to be blended in the unit 80 with the waste material pumped from the storage tank 70. Each of the one or more additive hoppers 86 is equipped with a dust collector 88 and is connected to the blender unit 80 by means of a butterfly valve 90. Additives to be blended with the waste material in the unit 80 are delivered into the additive hoppers by means of a filler pipe 92. For one class of waste, additives blended with the waste material in the unit 80 include portland cement and calcium carbonate. The ratio of calcium carbonate to portland cement for a particular waste material is determined by laboratory analysis of the waste. Also connected to the blender unit 80 is an air scrubber 94 of conventional design and operation.

In operation of the blender unit 80, waste material from the storage tank 70 is pumped by means of the slurry pumps 76 into the blender unit until the blender unit receives a full charge of waste material. The volume of waste material in the blender unit is known and the amount of additives to be blended with the waste material are delivered into the blender unit 80 from the additive hoppers 86 in the desired ratios. The blender unit 80 blends the additives with the waste material with water added as required by means of the filler pipe 26. The result is a concrete-like mixture wherein the waste material has been processed and treated to meet presently set environmental standards. This concrete-like material is then delivered into trucks for transportation to a permanent waste material storage site. The entire process of breaking up the sludge and removing foreign particles in the separator 12 and the homogenizing mixing in the homogenizer 32 is continuously repeated to replenish the supply of waste material in the storage unit 70 for processing in the blender unit 80. Additives and ratios of additives are varied depending on the waste being processed with the desired end result a concrete-like mass that meets presently set environmental standards.

Although a preferred embodiment of the invention has been illustrated in the accompanying drawings and the foregoing detailed description, it will be understood that the invention is capable of numerous rearrangements, modifications and substitutions of parts and elements without departing from the spirit and scope of the invention.

I claim:

1. A method for treating solid or highly viscous semi-solid waste materials containing lumps of waste comprising the steps of:

reducing the size of the lumps in the waste material with a plurality of paddle-type chopper augers, said paddle-type chopper augers being mounted in a separator;

homogenizing the waste material by means of pin mixers; and mixing the homogenized waste material with a predetermined amount of at least one selected additive.

2. An apparatus for mixing solid or semi-solid waste material with at least one selected additive comprising:

separator means for receiving the waste material and breaking up the received material into a desired consistency;

homogenizer means for receiving the waste material from said separator means for mixing the waste material into a substantially homogeneous mass, storage means for receiving the substantially homogeneous mass for holding the waste material for further processing, mixing means for receiving the substantially homogeneous mass from said storage means and mixing the received mass with a predetermined amount of at least one selected additive; and transfer means associated with said storage means for transferring the homogeneous mass from said storage means to said mixing means.

3. The apparatus of claim 2 wherein said homogenizing means comprises a pin mixer.

4. The apparatus of claim 2 wherein said separator means comprises at least one paddle-type auger.

5. The apparatus of claim 2 further including a plurality of additive hoppers for selectively feeding additives into said mixing means.

6. The apparatus of claim 2 further comprising means for selectively adding water to the waste materials for adjusting the consistency thereof.

7. The apparatus of claim 2 wherein said transfer means comprises a slurry pump for receiving the homogeneous mass from said homogenizer means and pumping the mass to said mixing means.

8. The apparatus of claim 2 further comprising means for selectively retaining said mixture in said mixing means for a predetermined period of time to obtain the desired degree of mixing.

9. An apparatus for mixing solid or semi-solid waste materials with at least one selected additive comprising:

a separator for receiving the waste material, said separator comprising a plurality of chopper augers located within said separator for reducing the size of lumps contained in said waste materials;

an homogenizer for receiving the waste material from said separator, said homogenizer comprising a plurality of pin mixers for mixing the waste material into a substantially homogeneous mass; and separating means associated with said separator for removing from the waste material foreign objects the size of which cannot be reduced by the chopper augers.

10. The apparatus of claim 9 wherein said plurality of chopper augers comprises a pair of paddle-type augers.

11. The apparatus of claim 9 wherein said plurality of chopper augers comprises two pair of paddle-type augers.

12. The apparatus of claim 11 wherein each of said chopper augers is selectively reversible.

13. The apparatus of claim 9 wherein said separating means comprises a plurality of electromagnets for selectively removing ferrous material from said waste materials.

14. The apparatus of claim 9 further comprising means for selectively adding water to said waste material for adjusting the consistency of said mixture.

15. The apparatus of claim 9 further comprising means for selectively retaining said mixture in said homogenizer for a predetermined period of time to obtain the desired degree of mixing.

16. The apparatus of claim 9 wherein said separator means comprises a separator dam between said separator and said homogenizer to aid in removing foreign objects from the waste material.

* * * * *